(12) United States Patent
Pursifull

(10) Patent No.: US 8,359,858 B2
(45) Date of Patent: Jan. 29, 2013

(54) TWIN TURBOCHARGED ENGINE WITH REDUCED COMPRESSOR IMBALANCE AND SURGE

(75) Inventor: Ross Dykstra Pursifull, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 546 days.

(21) Appl. No.: 11/928,174

(22) Filed: Oct. 30, 2007

(65) Prior Publication Data

US 2009/0107140 A1    Apr. 30, 2009

(51) Int. Cl.
*F02B 33/44* (2006.01)
*F02B 33/00* (2006.01)
*F02D 23/00* (2006.01)

(52) U.S. Cl. ............................. 60/612; 60/602; 123/562
(58) Field of Classification Search .................... 60/598, 60/600, 602, 605.1, 611, 612; 123/559–565
See application file for complete search history.

(56) References Cited

U.S. PATENT DOCUMENTS

| | | | | |
|---|---|---|---|---|
| 4,299,090 A * | 11/1981 | Deutschmann | .................. | 60/612 |
| 4,781,027 A * | 11/1988 | Richter et al. | ................... | 60/612 |
| 4,790,139 A * | 12/1988 | Roach | ............................. | 60/602 |
| 5,090,204 A * | 2/1992 | Bonitz et al. | .................... | 60/612 |
| 5,207,063 A * | 5/1993 | Blake | ............................... | 60/612 |
| 5,351,486 A * | 10/1994 | Yoshioka et al. | ............... | 60/612 |
| 5,845,495 A | 12/1998 | Schray et al. | | |
| 6,050,250 A * | 4/2000 | Kerkau | .......................... | 123/688 |
| 6,338,250 B1 * | 1/2002 | Mackay | .......................... | 60/612 |
| 6,357,234 B1 * | 3/2002 | Gladden | ......................... | 60/612 |
| 6,378,308 B1 * | 4/2002 | Pfluger | ............................ | 60/612 |
| 6,968,689 B2 * | 11/2005 | Bleile et al. | ....................... | 60/612 |
| 7,066,157 B2 * | 6/2006 | Takahashi et al. | .......... | 123/559.1 |
| 7,076,954 B1 * | 7/2006 | Sopko et al. | ..................... | 60/607 |
| 7,076,955 B2 * | 7/2006 | Herz et al. | ...................... | 60/612 |
| 7,334,405 B2 * | 2/2008 | Augstein et al. | ............... | 60/612 |
| 7,360,356 B2 * | 4/2008 | Narita et al. | .................... | 60/285 |
| 7,461,508 B2 * | 12/2008 | Rosin et al. | ..................... | 60/612 |
| 7,640,794 B2 * | 1/2010 | Farmer | ........................ | 73/114.39 |
| 7,665,297 B2 * | 2/2010 | Suzuki et al. | .................... | 60/287 |
| 7,770,393 B2 * | 8/2010 | Buckland et al. | ............... | 60/612 |
| 7,987,040 B2 * | 7/2011 | Buckland et al. | ............. | 701/103 |
| 8,001,782 B2 * | 8/2011 | Pursifull | ......................... | 60/612 |
| 2006/0021347 A1 | 2/2006 | Sun et al. | | |
| 2009/0013945 A1 * | 1/2009 | Buckland et al. | ............... | 60/612 |
| 2009/0018751 A1 * | 1/2009 | Buckland et al. | ............. | 701/103 |
| 2009/0107455 A1 * | 4/2009 | Pallett et al. | ................... | 123/299 |
| 2009/0107456 A1 * | 4/2009 | Pallett et al. | ................... | 123/299 |
| 2010/0024416 A1 * | 2/2010 | Gladden et al. | ................. | 60/612 |
| 2011/0041493 A1 * | 2/2011 | Doering et al. | ................. | 60/603 |

* cited by examiner

*Primary Examiner* — Thai Ba Trieu
(74) *Attorney, Agent, or Firm* — Julia Voutyras; Alleman Hall McCoy Russell & Tuttle LLP

(57) ABSTRACT

A method for reducing imbalance between multiple compressors supplying air to an engine is disclosed. In one embodiment, engine boost pressure is limited by choking flow through a compressor. The method may reduce compressor surge during some operating conditions.

20 Claims, 5 Drawing Sheets

TWIN TURBOCHARGED ENGINE WITH REDUCED COMPRESSOR IMBALANCE AND SURGE

BACKGROUND AND SUMMARY

Engines can utilize compression devices such as turbochargers and superchargers for boosting intake air. Some engines can include twin turbochargers each having a compressor arranged along separate air intake passages of the engine. Operation of the compressors can be controlled by wastegates arranged in exhaust passages bypassing the turbines. However, under some conditions, airflow provided by the separate turbochargers can become unbalanced. In particular, one of the compressors may experience surge if the turbochargers become sufficiently unbalanced.

Anti-surge valves may be used to remedy the imbalance between the turbochargers in some intake systems. However, in the example of a single anti-surge valve on a common intake system, single side compressor surge may still occur under selected conditions. For example, an engine with a common intake manifold for receiving intake air from each compressor can enter a condition where one of the compressors enters a surge condition, but the other compressor does not. Once a single side surge occurs, the surge condition can begin to oscillate between the compressors, which can cause an objectionable noise that may be referred to as noise, vibration, and harshness (NVH).

As one example, the above issues may be addressed by a method of operating a vehicle propulsion system including an engine having an intake manifold communicating with two compressors arranged in separate intake passages, the method comprising: adjusting a boost pressure provided to the engine by the first and the second compressors in response to a total flow of air consumed by the engine, said first and second compressors cooperating to provide the total flow; and during an imbalanced flow condition between the first and the second compressors, choking flow through the first compressor before the second compressor experiences surge. For example, the method may include limiting the boost pressure responsive to the total flow of air, where the choking limits a further reduction of flow through the second compressor, thereby reducing potential for surge.

In this way, a flow limitation resulting from the choke limit of a first compressor of the twin turbocharger system can be used to restrain a second compressor from entering a surge condition. For example, as the flow provided by the first compressor increases to its choke limit, any further reduction in the flow provided by the second compressor is limited by the total flow. Thus, by limiting the boost pressure to a suitable level based on a function of the total flow of intake air provided to the engine, single side compressor surge can be reduced or eliminated.

Note that there are various ways to adjust and/or limit boost pressure, including adjusting and/or limiting a corresponding compressor pressure ratio, for example.

DETAILED DESCRIPTION

Figure 1:
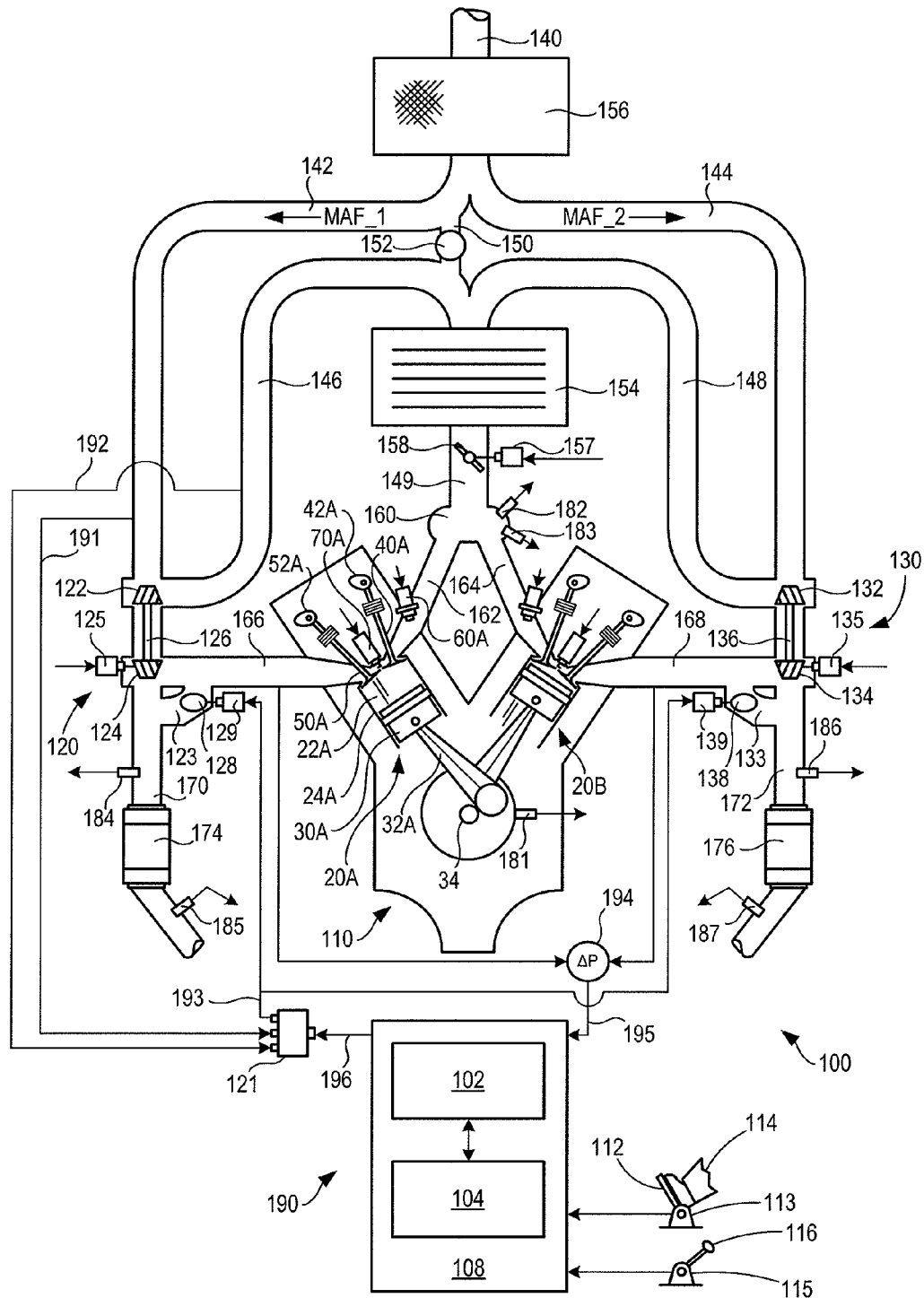
FIG. 1 shows a schematic depiction of an example engine system including twin turbochargers.
Figure 2:
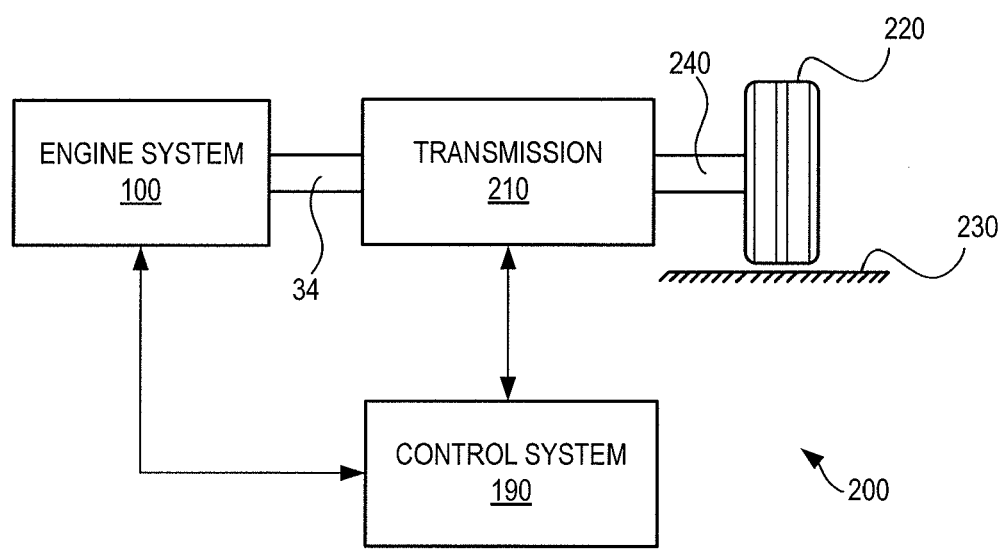
FIG. 2 shows the engine system of FIG. 1 configured as part of a vehicle propulsion system.

FIG. 1 shows a schematic depiction of an example engine system 100 including a multi-cylinder internal combustion engine 110 and twin turbochargers 120 and 130. As one non-limiting example, engine system 100 can be included as part of a propulsion system for a vehicle, as shown in FIG. 2. Engine system 100 can receive intake air from air source such as ambient via intake passage 140. Intake passage 140 can include an air filter 156. At least a portion of the intake air (MAF_1) can be directed to a compressor 122 of turbocharger 120 via a first branch of the intake passage 140 as indicated at 142 and at least a portion of the intake air (MAF_2) can be directed to a compressor 132 of turbocharger 130 via a second branch of the intake passage 140 as indicated at 144. Thus, compressors 122 and 132 can receive different flow rates of intake air from a common source.

The first portion of the total intake air (MAF_1) can be compressed via compressor 122 where it may be supplied to intake manifold 160 via intake air passage 146. Thus, intake passages 142 and 146 form a first branch of the engine's air intake system. Similarly, a second portion of the total intake air (MAF_2) can be compressed via compressor 132 where it may be supplied to intake manifold 160 via intake air passage 148. Thus, intake passages 144 and 148 form a second branch of the engine's air intake system.

As shown in FIG. 1, intake air from intake passages 146 and 148 can be recombined via a common intake passage 149 at or before reaching intake manifold 160, where the intake air may be provided to the engine. In this way, both of compressors 122 and 132 can be provide intake air to the engine via a common intake manifold. In some examples, intake manifold 160 may include an intake manifold pressure sensor 182 and/or an intake manifold temperature sensor 183, each communicating with electronic controller 108. Electronic controller 108 can comprise part of an engine control system indicated generally at 190. Intake passage 149 can include an air cooler 154 and/or a throttle 158. The position of the throttle can be adjusted by the control system via a throttle actuator 157 communicatively coupled to controller 108. During steady state conditions, control system 190 including controller 108 can adjust the position of throttle 158 to maintain the engine at a substantially constant torque output, which can be effectively equivalent to a constant airflow rate in some examples. Thus, throttle 158 can be controlled to vary the airflow rate provided to the engine to adjust the torque produced by the engine responsive to a level of torque requested by the control system or by the vehicle operator via an accelerator pedal, for example.

As shown in FIG. 1, an anti-surge valve 152 may be provided to selectively bypass the compressor stages of turbochargers 120 and 130 via bypass passage 150. As one example, anti-surge valve 152 can open to enable flow through bypass passage 150 when the intake air pressure upstream of the compressors attains a threshold value relative to the pressure downstream of the compressors.

Engine 110 may include a plurality of cylinders two of which are shown in FIG. 1 at 20A and 20B. Note that in some examples, engine 110 can include more than two cylinders such as 4, 5, 6, 8, 10 or more cylinders. These various cylinders can be equally divided and arranged in-line with one of cylinders 20A and 20B to form a Vee configuration. Cylinders 20A and 20B among other cylinders of the engine may be identical in some examples and can include identical components. As such, only cylinder 20A will be described in greater detail.

Cylinder 20A includes a combustion chamber 22A defined by combustion chamber walls 24A. A piston 30A is moveably disposed within combustion chamber 22A and is coupled to a crank shaft 34 via a crank arm 32A. Crank shaft 34 may include a speed and/or position sensor 181. Sensor 181 can communicate with control system 190 to provide an indication of engine speed and/or rotational position. Cylinder 20A can include a spark plug 70A for delivering an ignition spark to combustion chamber 22A. However, in some examples, spark plug 70A may be omitted, for example, where engine 110 is configured to provide combustion by compression ignition. Combustion chamber 22A may include a fuel injector 60A, which in this example is configured as a port based fuel injector. However, in other examples, fuel injector 60A can be configured as a direct in-cylinder injector.

Cylinder 20A can further include at least one intake valve 40A actuated via an intake valve actuator 42A and at least one exhaust valve 50A actuated via an exhaust valve actuator 52A. Cylinder 20A can include two or more intake valves and/or two or more exhaust valves along with associated valve actuators. In this particular example, actuators 42A and 52A are configured as cam actuators, however, in other examples, electromagnetic valve actuators (EVA) may be utilized. Intake valve actuator 42A can be operated to open and close intake valve 40A to admit intake air into combustion chamber 22A via intake passage 162 communicating with intake manifold 160. Similarly, exhaust valve actuator 52A can be operated to open and close exhaust valve 50A to exhaust products of combustion from combustion chamber 22A into exhaust passage 166. In this way, intake air may be supplied to combustion chamber 22A via intake passage 162 and products of combustion may be exhausted from combustion chamber 22A via exhaust passage 166.

It should be appreciated that cylinder 20B or other cylinders of engine 110 can include the same or similar components of cylinder 20A as described above. Thus, intake air may be supplied to combustion chamber 22B via intake passage 164 and products of combustion may be exhausted from combustion chamber 22B via exhaust passage 168. Note that in some examples a first bank of cylinders of engine 110 including cylinder 20A as well as other cylinders can exhaust products of combustion via a common exhaust passage 166 and a second bank of cylinders including cylinder 20B as well as other cylinders can exhaust products of combustion via a common exhaust passage 168.

Products of combustion exhausted by engine 110 via exhaust passage 166 can be directed through exhaust turbine 124 of turbocharger 120, which in turn can provide mechanical work to compressor 122 via shaft 126, thereby increasing the boost pressure provided to the engine cylinders. Similarly, products of combustion exhausted via exhaust passage 168 can be directed through exhaust turbine 134 of turbocharger 130, which in turn can provide mechanical work to compressor 132 via shaft 136, thereby further increasing the boost pressure provided to the engine cylinders.

In some examples, turbines 124 and 134 may be sized to deliver a suitable level of work to their respective compressors over a variety of different operating conditions. During some conditions, such as at higher engine torques, more exhaust gas than is necessary to provide the requested boost pressure may be supplied to the turbines. Therefore, turbine 124 may include a turbine bypass passage 123 and wastegate 128 that may be opened or once a threshold boost pressure or corresponding compressor pressure ratio is attained so that excess exhaust gas energy can diverted through the turbine bypass, thereby limiting the boost pressure and corresponding compressor pressure ratio to a particular value or range of values. Similarly, turbine 132 may include a turbine bypass 133 and wastegate 138.

The position of wastegates 128 and 138 can be controlled by respective actuators 129 and 139. Note that these actuators may be mechanically controlled, electrically controlled, or may utilize a combination of mechanical and electrical control. FIG. 1 shows one non-limiting example of a mechanical wastegate actuation system, which is shown in greater detail in FIG. 6A. However, in other examples, the wastegate actuation systems of FIGS. 6B and 6C may be alternatively used instead of the system presented in FIG. 1 and FIG. 6A.

Referring to the example wastegate actuation system of FIG. 1, a valve 121 can receive air pressure via passage 191 located upstream of one of the compressors and via passage 192 located downstream of the compressor. The air pressure received from each of passage 191 and 192 can be mixed to obtain a resultant air pressure in a third passage indicated at 193 via valve 121. In this example, controller 108 can adjust the proportion of air pressure provided to passage 193 by each of passages 191 and 192 as indicated by control signal 196, in response to an indication of pressure difference between separate exhaust streams of the engine. For example, a pressure difference between exhaust passage 166 and 168 can be provided to controller 108 as indicated at 195 by pressure difference indicator 194. A pressure difference indicated by pressure difference indicator 194 located between the exhaust passages upstream of the respective turbochargers also indicates that there is a speed difference between the turbochargers. In response to an indication of pressure difference or a corresponding speed difference between the turbochargers, the control system can utilize counteracting control to reduce the pressure difference. Counteracting control may include biasing the wastegate actuation systems (in the case where independent actuation systems are provided for each wastegate) such that the pressure difference between the exhaust streams tends to zero. For example, the control system can increase or decrease the actuation pressure for one of the wastegates relative to the other wastegates to reduce the pressure difference, thereby reducing the corresponding speed difference between turbochargers.

Air passage 193 can communicate with actuators 129 and 139 as will be described in greater detail with reference to FIG. 6A. Thus, controller 108 can control each of wastegates 128 and 138 to a common boost pressure provided by each of the compressors by monitoring the pressure difference of the exhaust streams upstream of their respective turbines. However, in other examples, each wastegate can have its own wastegate actuation system as shown in one or FIGS. 6A-6C to enable individual adjustment of the wastegate actuation setpoint relative to the setpoint of another wastegate. For example, a first wastegate associated with a first turbine bypass can include a first wastegate actuation system as shown in one of FIGS. 6A-6C, while a second wastegate associated with a second turbine bypass can include a second wastegate actuation system shown in one of FIGS. 6A-6C, which can be similar to or different than the first wastegate actuation controller. Furthermore, in some examples, the wastegate actuation systems of a first and second wastegates can share some common components. For example, with reference to FIG. 6B, independent wastegate actuation systems can utilize a common or shared vacuum canister indicated at 646. The various wastegate actuation systems shown in FIGS. 6A-6C will be described in greater detail below.

Thus, some or all of the exhaust gases flowing through exhaust passage 166 can bypass turbine 124 via turbine bypass passage 123 as controlled by wastegate 128. The position of wastegate 128 may be controlled by an actuator 129. By increasing the opening of wastegate 128, the amount of exhaust flow bypassing the turbine can be increased, thereby reducing the amount of work or power provided to compressor 122. Thus, by increasing the opening of wastegate 128, the boost pressure and/or volumetric flow rate of intake air provided to the engine by compressor 122 can be reduced, while reducing the opening of wastegate 128 can increase the volumetric flow rate and/or boost pressure provided by the compressor.

Similarly, products of combustion that are exhausted by engine 110 via exhaust passage 168 can be directed through exhaust turbine 134 of turbocharger 130, which in turn can provide mechanical work to compressor 132 via shaft 136 in order to provide compression to intake air flowing through the second branch of the engine's intake system. Exhaust gases can be controlled to bypass turbine 134 via bypass passage 133 by adjusting the position of wastegate 138 via actuator 139. By increasing the opening of wastegate 138, the amount of exhaust flow bypassing the turbine can be increased, thereby reducing the amount of work or power provided to compressor 132. Thus, by increasing the opening of wastegate 138, the boost pressure and/or volumetric flow rate of intake air provided to the engine by compressor 132 can be reduced, while reducing the opening of wastegate 138 can increase the volumetric flow rate and/or boost pressure provided by the compressor. In some examples, wastegates 128 and 138 may be controlled to a common boost pressure or compressor pressure ratio and a common volumetric flow rate, thereby enabling a balancing of the compressors.

Figure 6A:
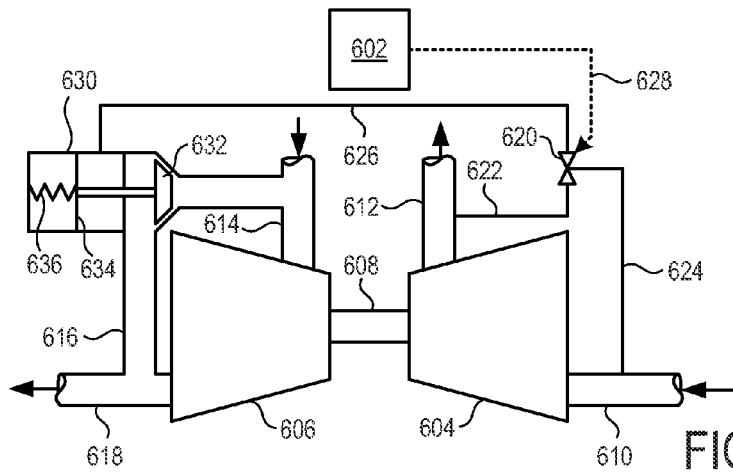
FIGS. 6A-6C show example wastegate actuation systems in greater detail.

Referring now to FIG. 6A, a more detailed view of the example wastegate actuation system shown in FIG. 1 is shown. A compressor 604 and associated turbine 606 are mechanically coupled via shaft 608. Intake air can be received by the compressor via intake passage 610 where it may be discharged via passage 612 and is provided to an engine arranged downstream. Exhaust gases produced by the engine can be received by the turbine via exhaust passage 614 where it may be discharged via exhaust passage 618. Energy contained in the exhaust gases passing through the turbine may be converted to shaft work at 608 for turning the compressor. Alternatively, some or all of the exhaust flow may be diverted around the turbine via bypass passage 616. The bypass passage may include a wastegate indicated at 632, which may be adjusted to open or close the bypass passage via an actuator 630. Thus, FIG. 6A shows an example turbocharger as may be used in FIG. 1 as turbochargers 120 or 130.

Air may be received at valve 620 via passages 624 and 622 where they can be mixed in response to control signal 628 received from controller 602 and can provide a resultant air pressure to actuator 630 via passage 626. As one example, valve 620 may include a proportional valve that is adjustable by controller 602. Actuator 630 can include a spring 636 supporting a flexible diaphragm 634 that is coupled to wastegate 632. By varying the air pressure provided to a first side of the flexible diaphragm, the position of wastegate 632 can be adjusted to open or close bypass passage 616. For example, valve 620 can be used as valve 121 and actuator 630 can be used as actuator 129 or 139 of FIG. 1. In this way, an electronic controller can adjust the position of the wastegate to increase or reduce the boost pressure that is provided by the compressor. Furthermore, by selecting a setpoint position of the proportional valve, the control system (e.g. including controller 602) can set the wastegate pressure setpoint at which the wastegate opens to limit compressor boost pressure and the corresponding pressure ratio across the compressor. Note that in some examples, each wastegate may include its own wastegate actuation system to enable separate boost pressures to be set for each wastegate. Thus, where an imbalance occurs between turbochargers, the control system can respond by increasing or decreasing the pressure setpoint of one of the wastegates (e.g. by varying the a setting of valve 620) relative to the other wastegate to reduce the imbalance.

Figure 6B:
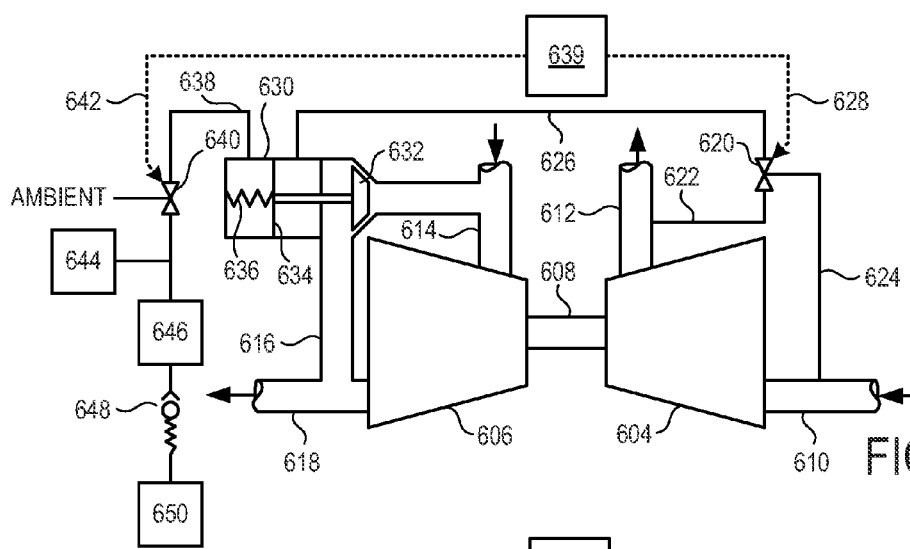

FIG. 6B shows an alternative example of the wastegate actuation system shown in FIG. 1 and FIG. 6A. In this example, a controller indicated at 639 can be configured to adjust a second valve 640 as indicated by control signal 642 to vary the air pressure provided to a second side of flexible diaphragm 634 to enable greater adjustment of the wastegate boost pressure setpoint. For example, valve 640 can receive air pressure from an ambient source and from a vacuum storage canister 646. Canister 646 can also be used to provide vacuum to the power brakes indicated at 644. Note that in some examples where each of wastegates 128 and 138 include their own wastegate actuation system (e.g. as shown in FIG. 6B), each actuation system can share a common vacuum storage canister. A vacuum may be created in canister 646 by communicating with intake manifold 650 via a one-way check valve 648. As one example, manifold 650 can be used as manifold 160 of FIG. 1. By adjusting the proportion of ambient air and vacuum via valve 640, the resultant air pressure provided to the second side of the diaphragm via passage 638 can be increased or decreased.

The controller can select the boost pressure provided by the compressor by adjusting the relative pressure difference between each side of the diaphragm. For example, the controller can increase the boost pressure provided by the compressor by increasing the pressure setpoint of the wastegate by increasing the pressure provided to actuator 630 by passage 638 relative to the pressure provided by passage 626. Likewise, the controller can reduce the boost pressure provided by the compressor by reducing the pressure setpoint of the wastegate by reducing the pressure provided to the actuator by passage 638 relative to the pressure provided by passage 626. In this way, the wastegate actuation system shown in FIG. 6B can enable a greater selection of boost pressure setpoints than the system of FIG. 6A, since the pressure at each side of the flexible diaphragm can be adjusted independently.

Figure 6C:
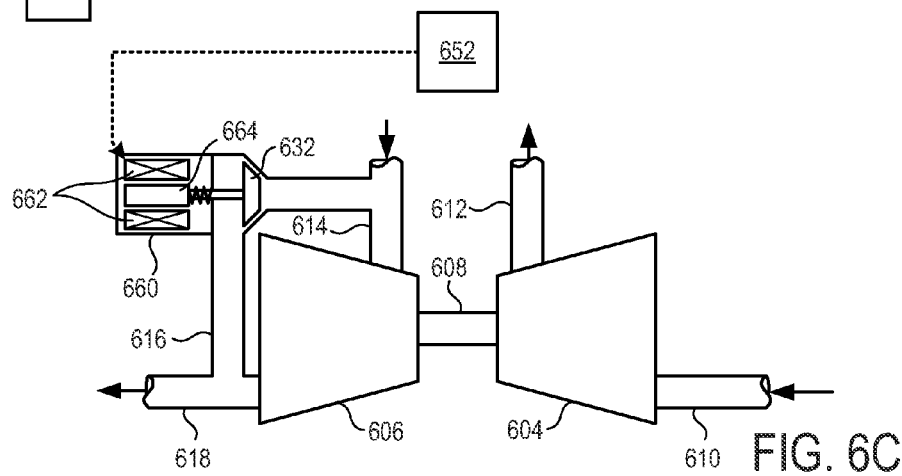

FIG. 6C shows an electrically controlled wastegate actuation system. In this example, a controller 652 can adjust the position of wastegate 632 by varying the amount of electrical energy provided to coils 662 of solenoid 664. Alternatively, rather than a solenoid actuation system, actuator 660 can include a electrically controlled servo motor or other suitable electrical or electromagnetic actuation device. Regardless of the particular configuration, it should be appreciated that control system 190 of FIG. 1 can be configured to limit the boost pressure provided by each of the compressors to a boost pressure select target boost pressure and corresponding compressor pressure ratio by utilizing wastegate adjustment. Note that each wastegate can include its own actuation system as shown in FIG. 6C to enable independent control of the wastegate actuation setpoint, thereby enabling independent adjustment of the speed of each compressor.

In some examples, exhaust turbines 124 and 134 may be configured as variable geometry turbines, whereby associated actuators 125 and 135 may be used to adjust the position of the turbine impeller blades to vary the level of energy that is obtained from the exhaust gas flow and imparted to their respective compressor. For example, the control system can be configured to independently vary the geometry of the exhaust gas turbines 124 and 134 via their respective actuators 125 and 135.

Products of combustion exhausted by one or more cylinders including cylinder 20A via exhaust passage 166 can be directed to ambient via exhaust passage 170. Exhaust passage 170 may include an exhaust after treatment device such as catalyst 174, and one or more exhaust gas sensors indicated at 184 and 185, for example. Similarly, products of combustion exhaust by one or more cylinders via exhaust passage 168 can be directed to ambient via exhaust passage 172. Exhaust passage 172 may include an exhaust after treatment device such as catalyst 176, and one or more exhaust gas sensors indicated at 186 and 187, for example. Exhaust gas sensors 184, 185, 186, and/or 187 can communicate with control system 190. In other examples, exhaust passages 170 and 172 may be recombined Engine system 100 can include various other sensors communicating with controller 108 of control system 190 including an ambient air temperature sensor and an ambient air pressure sensor. Control system 190 can include one or more engine system controllers including at least controller 108 and each can be configured to communicate with the various sensors and actuators described herein. As one example, controller 108 can include an input/output interface for sending and receive electronic signals with the various sensors and actuators, a central processing unit indicated at 102, memory indicated at 104 such as random accessible memory (RAM), read-only memory (ROM), keep alive memory (KAM), each of which can communicate via a data bus. Controller 108 may include a proportional-integral-derivative (PID) controller in some examples. However, it should be appreciated that other suitable controllers may be used as can be appreciated by one skilled in the art in light of the present disclosure.

Controller 108 of control system 190 can receive an indication of vehicle operator input via one or more user input devices. For example, an accelerator pedal 112 may include an accelerator pedal position sensor 113 that provides an indication of accelerator pedal position as operated by a vehicle operator 114. Similarly, a transmission gear selector 116 including a sensor 115 can provide an indication of the transmission gear selected by the vehicle operator.

Controller 108 of control system 190 can be configured to vary one or more operating parameters of the engine on an individual cylinder basis. For example, the control system can adjust valve timing by utilizing a variable cam timing (VCT) actuator, spark timing by varying the time at which the spark signal is provided to the spark plug, and/or fuel injection timing and amount by varying the pulse width of the fuel injection signal that is provided to the fuel injector by the control system.

FIG. 2 shows the engine system of FIG. 1 configured as part of a vehicle propulsion system 200. In particular, FIG. 2 shows how a mechanical output via crankshaft 34 of engine system 100 can be provided to at least a drive wheel 220 of the vehicle communicating with a ground surface 230 via a transmission 210. Transmission 210 can provide a selectable gear ratio between input shaft 34 and an output shaft 240 of the transmission in response to a gear ratio selected by the control system or by the vehicle operator. As one example, transmission 210 may include a plurality of discrete gear ratios. As another example, transmission 210 may be a continuously variable transmission that can enable the gear ratio to be varied between a near infinite quantity of different gear ratios. Control system 190 can communicate with transmission 210 to select the gear ratio provided by the transmission as well as receiving operating condition information from engine system 100 and providing actuation signals to the engine system.

Figure 3:
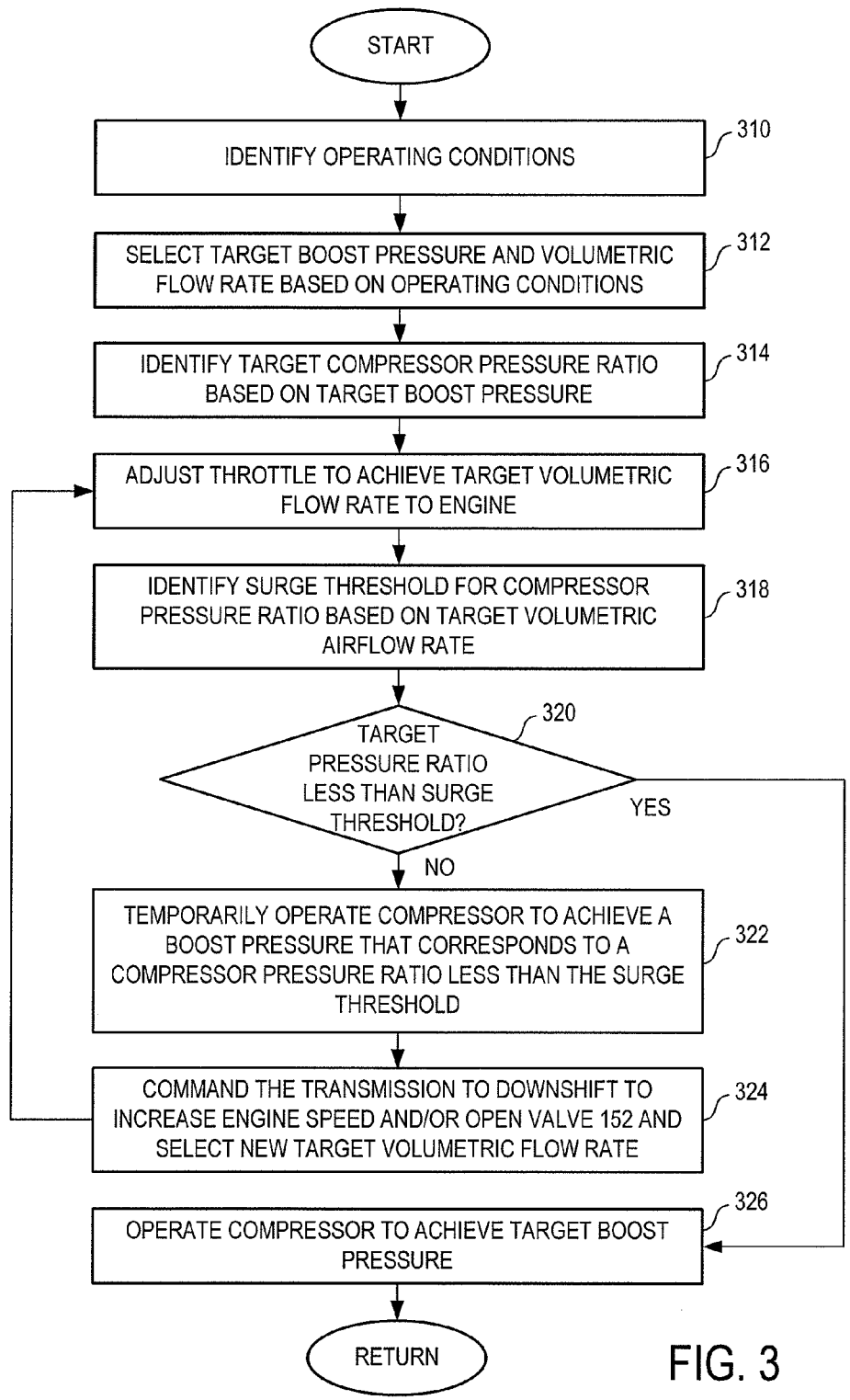
FIG. 3 shows a flow chart depicting an example control strategy for controlling a twin turbocharged engine system.

FIG. 3 shows a flow chart depicting an example control strategy for controlling a twin turbocharged engine system. At 310, the operating conditions of the engine system can be identified. For example, the control system can obtain an indication one or more of the following operating conditions: engine speed, vehicle speed, transmission state including the selected gear or gear ratio, ambient conditions such as ambient air temperature and barometric pressure, and vehicle operator demands communicated via vehicle controls such as accelerator pedal 112 or a transmission gear selector 116, among other suitable operating conditions.

At 312, a target boost pressure and a target volumetric flow rate may be selected based on the operating conditions identified at 310. The boost pressure can represent the intake air pressure within the intake system downstream of a compressor. Thus, the boost pressure is the pressure at the output of the compressor. The volumetric flow rate is the total volumetric flow rate of intake air that is provided to the engine, for example, by way of common intake manifold 160.

The target volumetric flow rate can be selected in response to the level of torque requested by the vehicle operator for a given engine speed. By increasing the volumetric flow rate of intake air that is provided to the engine, the amount of torque produced by the engine may be increased. Conversely, by reducing the volumetric flow rate of intake air that is provided to the engine, the amount of torque produced by the engine may be reduced. As one example, the control system can select a target volumetric flow rate in response to the operating conditions identified at 310 based on a look-up table, control map, or algorithm stored in memory.

The target boost pressure can be selected in response to various operating conditions including the present volumetric flow rate or the target volumetric flow rate that was selected at 312. As one non-limiting example, the target boost pressure can be selected so that a first compressor having a higher volumetric flow rate would necessarily reach its choke limit before a second compressor of the twin turbocharged engine system reaches its surge limit.

In the twin turbocharged engine system of FIG. 1, the twin turbochargers provide boosted intake air to a common intake manifold in parallel. Thus, the total volumetric flow rate provided to the engine is equal to the summation of the volumetric flow rate of the first compressor (e.g. compressor 122) and the volumetric flow rate of the second compressor (e.g. compressor 132). When the turbochargers are unbalanced, a reduction in the volumetric flow rate of the first compressor is offset by a corresponding increase in the volumetric flow rate of the second compressor. Furthermore, due to the common intake manifold to which the compressor provide the boosted airflow and the common ambient source of air from which the compressor draw the intake air, the boost pressure provided by each compressor and hence the pressure ratio across each compressor is substantially the same.

Figure 4:
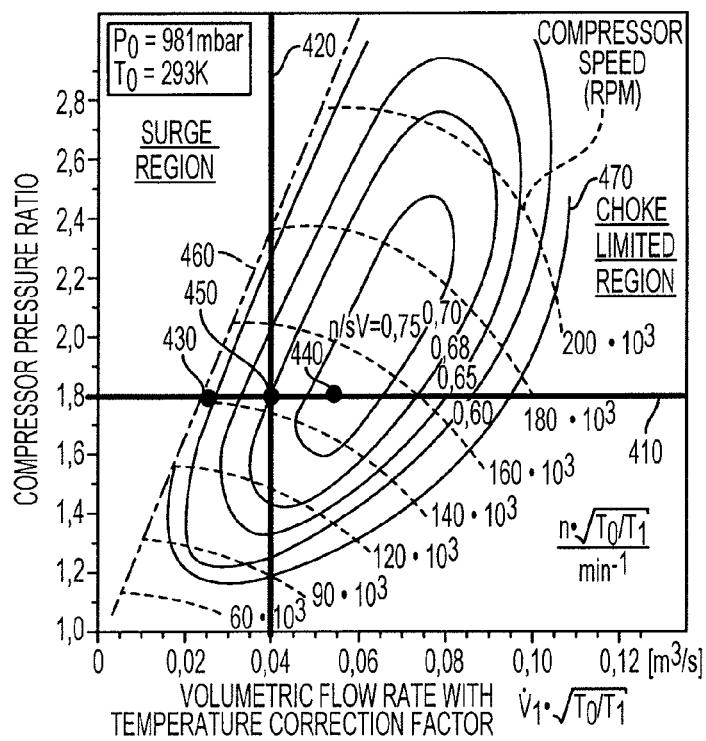
FIGS. 4 and 5 show example compressor maps.

Referring also to FIG. 4, an example compressor map is shown. In this particular example scenario, the compressors are controlled to a constant boost pressure by their respective wastegate controllers. The boost pressure provided by the compressors can be related to the compressor pressure ratio by the following equation:

$$\text{Compressor\_Pressure\_Ratio} = \text{Boost\_Pressure} / \text{Barometric Pressure}$$

Thus, at a constant barometric pressure, the boost pressure is functionally equivalent to the compression ratio as indicated on the vertical axis of the map of FIG. 4. Where the wastegates are controlled to maintain the boost pressure to a substantially constant value, the compressor pressure ratio also follows a constant value. For example, as shown in FIG. 4, a compressor pressure ratio of 1.8 is represented at 410 by a horizontal line. Note that the boost pressure and hence the compressor pressure ratio need not be controlled to constant value, but may be varied by the control system in response to changing operating conditions such as the demand of the vehicle operator.

Where the throttle is controlled to maintain the volumetric flow rate of intake air to the engine at a substantially constant value, volumetric flow rate can be represented as a vertical line on the map of FIG. 4, as indicated at 420. Note that the boost pressure and hence the compressor pressure ratio need not be controlled to constant value, but may be varied by the control system in response to changing operating conditions such as the demand of the vehicle operator.

During a condition where the turbochargers are balanced (e.g. provide substantially equivalent volumetric airflow to the engine) at a given boost pressure or compressor pressure ratio, each of the compressors will be operated at the intersection of lines 410 and 420, which in this example is shown at 450. However, during conditions where the turbochargers are unbalanced, one of the turbochargers may be providing a higher volumetric flow rate than the other turbocharger. As previously described, the parallel arrangement of the turbocharger compressors ensures that a decrease in the volumetric flow rate of a first compressor causes a corresponding increase in the volumetric flow rate of the second compressor for a given total volumetric flow rate provided to the engine. FIG. 4 shows an example of a first compressor providing a lower volumetric flow rate as indicated at operating point 430 and a second compressor providing a higher volumetric flow rate as indicated at operating point 440. Thus, where the map of FIG. 4 shows volumetric flow rate along the horizontal axis in a linear manner, the operating points of the first and second compressors are necessarily symmetric about a vertical axis created by line 420.

The compressor map of FIG. 4 includes a surge region separated from the compressor operating region by a surge line indicated at 460. The compressor map of FIG. 4 also includes a choke limited region separated from the compressor operating region by a choke limit line indicated at 470.

In the example of FIG. 4, the one of the compressors represented by operating point 430 is approaching the surge line 460. When the operating point of the compressor reaches the surge line or is within the surge region, the compressor can experience surge or compressor stall. During compressor surge, the compressor's rotor blades can lose their lifting capability, which may cause further reduction in volumetric flow rate of air provided to the engine, may increase compressor noise, and may damage or degrade the compressor. Additionally, surge of one of the twin parallel compressors may cause an oscillatory surge condition to occur in the other compressor, which may also degrade engine performance and cause engine noise and vibration harshness (NVH). In contrast to the surge region, when the operating point of a compressor reaches the choke limit line, the compressor may be physically constrained from providing any additional intake air to the engine. Thus, a compressor typically cannot provide a volumetric flow rate that exceeds the choke limit line for a given compressor pressure ratio or boost pressure.

Figure 5:
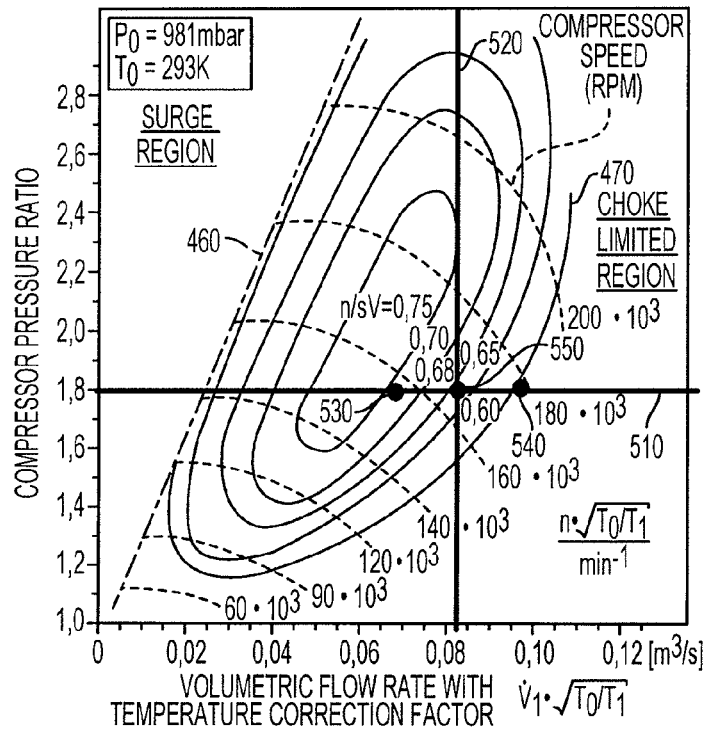

Thus, as can be observed from the example shown in FIG. 4, the compressor represented by operating point 430 is able to continue to reduce its volumetric flow rate until it reaches the surge line since the reduction in volumetric flow rate can be supplemented by an increase in volumetric flow rate provided by the second compressor represented by operating point 440. In contrast, FIG. 5 shows an example where the compressor pressure ratio and hence boost pressure of the compressors has been selected for the given volumetric flow rate 520 such that the compressor providing the higher volumetric flow rate, as indicated at 540, is constrained by the choke limit line 470 before the efficiency of the compressor providing the lower volumetric flow rate, as indicated at 530, begins to decrease. Thus, if the volumetric flow rates provided by the twin parallel compressors begin to diverge from a balanced flow condition indicated at 550, the compressor providing the higher flow rate reaches its mechanical choke limit before the other compressor experiences surge. Since the higher flow rate compressor is unable to further increase its flow rate upon reaching its choke limit, the other compressor can be protected from the surge condition. In this way, a target boost pressure or compressor pressure ratio can be commanded that enables each compressor to restrain the other compressor from experiencing surge by first reaching its choke limit.

Returning to FIG. 3, at 314, the target compressor pressure ratio can be identified by dividing the target boost pressure selected at 312 by the barometric pressure identified at 310. At 316, the position or opening of throttle (e.g. throttle 158) can be adjusted to provide the target volumetric flow rate at the engine. By increasing the throttle opening, the volumetric flow rate can be increased and by reducing the throttle opening, the volumetric flow rate can be reduced. For example, the control system can adjust the throttle position via actuator 157 in response to a difference between the target volumetric flow rate and the measured or inferred volumetric flow rate of intake air that is provided to the engine. The volumetric flow rate can be measured or inferred by the control system based on feedback received from some of the previously described sensors. For example, the control system can use an indication of engine speed (e.g. via sensor 181), intake manifold temperature (e.g. via sensor 183), intake manifold pressure (e.g. via sensor 182), and/or a mass airflow sensor arranged along an intake passage of the combined flow region of the intake system or alternatively two mass airflow sensors each arranged along one of the intake or exhaust passages dedicated to a single turbocharger.

At 318, a surge threshold for the target volumetric flow rate can be identified, which represents a compressor pressure ratio or corresponding boost pressure that may be selected above which compressor surge may occur. In other words, the surge threshold can represent the greatest boost pressure or compressor pressure ratio that may be utilized while still ensuring that the higher flowing compressor will reach its choke limit before the other compressor can experience surge. As one non-limiting example, the control system may enforce a condition where the target compressor pressure ratio (or target boost pressure) is maintained less than a function of the volumetric flow rate and a temperature correction factor. For example, the target compressor pressure ratio can be limited by the following equation:

$$\text{Target\_Compressor\_Pressure\_Ratio} < f\left(\text{Volumetric\_Flow\_Rate} * \sqrt{\frac{\text{Intake Air Temperature}}{\text{Compressor Outlet Temperature}}}\right)$$

Hence, the surge threshold can be represented by the following equation:

$$\text{Surge Threshold} = f\left(\text{Volumetric\_Flow\_Rate} * \sqrt{\frac{\text{Intake Air Temperature}}{\text{Compressor Outlet Temperature}}}\right)$$

The volumetric flow rate of the above equation can include the present or actual volumetric flow rate provided to the engine or the target volumetric flow rate. The intake air temperature can be obtained from an ambient air temperature sensor communicating with the control system or a temperature sensor arranged within the intake system upstream of the compressor. The compressor outlet temperature can be inferred thermodynamically from the intake air temperature, barometric pressure, and/or the volumetric flow rate of the compressor. In some examples, the temperature correction term including the intake and outlet temperatures may be omitted from the equation since the temperature correction may address minor effects of temperature difference across the compressor. Note that the above equation may be performed based on the assumption that the compressors are balanced (i.e. providing similar volumetric airflow), since a suitable target compressor pressure ratio or corresponding target boost pressure can be selected that ensures that the higher airflow compressor reaches its choke limit before the other compressor is able to experience surge.

At 320, it may be judged whether the target compressor pressure ratio identified at 314 or the corresponding target boost pressure selected at 312 are less than the surge threshold identified at 318. In other words, it may be judged whether the target compressor pressure ratio (or actual pressure ratio) would violate the surge limit if it were commanded by the control system. If the target pressure ratio (or actual pressure ratio) are less than the surge limit, then the compressors can be operated at 326 to achieve the target boost pressure and hence target compressor pressure ratio. The routine may then return to the start, whereby subsequent operating conditions may be identified and the routine may be again repeated.

With the example configuration shown in FIG. 1, the compressors may be controlled to their target boost pressure and corresponding pressure ratio by the control system via active control of the turbine wastegates. As one example, the wastegates may be each controlled to a discrete common boost pressure limit such 8 psi or 3 psi. Thus, in the examples shown in FIGS. 4 and 5, the compressor pressure ratio corresponding to the selected boost pressure limit can be represented as horizontal lines 410 and 510, respectively. Where a mechanical wastegate controller (e.g. controller 131) is used to limit boost pressure, a spring/diaphragm may be selected to provide a prescribed boost pressure limit. However, in other examples, a plurality of selectable target boost pressure setpoints may be provided. For example, with a mechanical wastegate controller or controller system may include a second wastegate vacuum/vent control solenoid that applies a vacuum (e.g. from a vacuum storage canister) to bias the mechanical wastegate controllers as shown in FIG. 6B. In this way, the wastegate controller can increase and/or decrease the boost pressure or compressor pressure ratio set point at 316 as directed by the target boost pressure and corresponding target compressor pressure ratio selected at 312 and 314.

Returning to FIG. 3, if it is judged at 320 that the target pressure ratio (or actual pressure ratio) is not less than the surge threshold, then the routine may proceed to 322. At 322, the compressors may be temporarily operated to achieve a boost pressure that corresponds to a compressor pressure ratio that is less than the surge threshold. For example, a boost pressure and corresponding compressor pressure ratio limit can be selected by the control system via wastegate control based on a map or look-up table stored in memory. At 324, the transmission can be commanded to downshift or to increase the gear ratio by the control system to increase the engine speed, thereby enabling an increase in the volumetric flow rate that can be provided to the engine for a given engine torque and vehicle speed. The increase in volumetric flow rate can enable a wider selection or use of boost pressures and corresponding compressor pressure ratios where surge may be reduced by the choke limit of the other compressor. Thus, at 324, the control system can select a new target volumetric flow rate based on the new engine speed, for example, as previously described at 312.

Alternatively or additionally at 324, valve 152 may be opened by the control system in order to increase the volumetric flow rate of each compressor, thereby moving the compressor operating points away from the compressor surge line and toward the compressor choke line. Opening valve 152 can increase compressor flow via circulating a portion of the airflow back to the upstream side of the compressors before it enters the engine. Thus, by selectively opening valve 152 in parallel with the compressor flow, the compressor flow can be increased without substantially increasing the flow rate of air through the engine, thereby biasing the system away from the surge line. Since the wastegates are already limiting the boost at this operating point, shunting a portion of the compressor flow does not substantially reduce the boost pressure provided to the engine.

The routine can then return to 316, where the throttle is adjusted to maintain the target volumetric flow rate. The target compressor pressure ratio and corresponding target boost pressure that were originally selected at 312 can be again compared to an updated surge threshold identified at 318 for the newly increased volumetric flow rate. Alternatively, from 324, the routine may proceed to 310 or other suitable operation to select a new target boost pressure and corresponding target compressor pressure ratio. In this way, a suitable boost pressure can be selected by the control system for a given volumetric flow rate such that an imbalance in flow rate between compressor can be arrested by the choke limit of the higher flow rate compressor, thereby reducing or eliminating the possibility of the lower flow rate compressor experiencing surge.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used.

Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method of operating an engine having an intake manifold communicating with first and second compressors arranged in separate intake passages, the method comprising:
adjusting a boost pressure provided to the engine by the first and the second compressors in response to a total volumetric flow rate of air consumed by the engine, said first and second compressors cooperating to provide the total volumetric flow rate; and
adjusting a volumetric flow rate of the first compressor and a volumetric flow rate of the second compressor via at least one actuator in response to a compressor surge threshold so that one of the first and second compressors operates closer to a choked flow condition than the other of the first and second compressors operates to a surge condition.

2. The method of claim 1, where said adjusting the boost pressure includes limiting the boost pressure in response to the total volumetric flow rate of air consumed by the engine, and where during an imbalanced flow condition between the first and second compressors, a flow through the first compressor is greater than a flow through the second compressor, and where a compressor choked flow condition further limits reduction of flow through the second compressor, the method further comprising: increasing the total volumetric flow rate of air consumed by the engine by increasing a gear ratio of a transmission; and increasing a boost pressure limit via adjusting a position of a wastegate in response to said increasing of the transmission gear ratio, and where an output shaft of the engine is coupled to a vehicle drive wheel via the transmission.

3. The method of claim 2, wherein said adjusting the total volumetric flow rate of air consumed by the engine includes increasing the total volumetric flow rate of air consumed by the engine by increasing the gear ratio; and increasing the boost pressure limit in response to the increased gear ratio.

4. The method of claim 1, wherein the total volumetric flow rate of air through the engine includes a total volumetric flow rate of intake air.

5. The method of claim 1, wherein the first compressor is fixedly coupled to a first turbine arranged in a first exhaust stream of the engine and the second compressor is fixedly coupled to a second turbine arranged in a second exhaust stream of the engine; and further comprising limiting the boost pressure provided to the engine by adjusting a volumetric flow rate of the first exhaust stream provided to the first turbine and adjusting a volumetric flow rate of the second exhaust stream provided to the second turbine.

6. The method of claim 5, wherein the volumetric flow rate of the first exhaust stream provided to the first turbine is adjusted by adjusting an opening of a first wastegate arranged in a first bypass passage of the first turbine; and wherein the volumetric flow rate of the second exhaust stream provided to the second turbine is adjusted by adjusting an opening of a second wastegate arranged in a second bypass passage of the second turbine.

7. The method of claim 1, further comprising adjusting the total volumetric flow rate of air consumed by the engine by adjusting an opening of a throttle arranged along an intake passage of the engine common to the first and second compressors; and increasing a boost pressure limit in response to the opening of the throttle.

8. The method of claim 7, wherein the boost pressure limit is increased by adjusting a first vacuum pressure provided to a first wastegate actuator arranged along a first turbine bypass passage of the engine and by adjusting a second vacuum pressure provided to a second wastegate actuator arranged along a second turbine bypass passage of the engine.

9. A method of operating a twin turbocharged engine including an internal combustion engine receiving intake air from a common ambient air supply via a first compressor of a first turbocharger and a second compressor of a second turbocharger, said first compressor rotationally coupled with a first exhaust turbine arranged in a first branch of an exhaust system and said second compressor rotationally coupled with a second exhaust turbine arranged in a separate second branch of the exhaust system, the method comprising:
in response to a first imbalanced flow condition between the first and second compressors while operating the twin turbocharged engine at a higher volumetric flow rate of intake air, adjusting volumetric flow rates of the first and second compressors such that when the volumetric flow rate of the first compressor increases, the volumetric flow rate of the first compressor reaches a choked flow region of the first compressor before the volumetric flow rate of the second compressor surges to compensate for the volumetric flow rate of the first compressor by opening bypass wastegates of the first and the second turbine to limit a boost pressure provided to the twin turbocharged engine by the first and second compressors to a first level; and
in response to a second imbalanced flow condition between the first and second compressors while operating the twin turbocharged engine at a lower volumetric flow rate of intake air, adjusting volumetric flow of the first and second compressors such that when a flow rate of the first compressor increases, the flow rate of the first compressor reaches a choked flow region of the first compressor before the second compressor surges to compensate for the flow rate of the first compressor by selectively opening the bypass wastegates of the first and second turbines to limit the boost pressure provided by the twin turbocharged engine by the first and second compressors to a second level.

10. The method of claim 9, further comprising adjusting a throttle arranged along an intake passage of the twin turbocharged engine common to both the first and second compressors to adjust a volumetric flow rate of air consumed by the internal combustion engine.

11. The method of claim 9, further comprising adjusting a gear ratio of a transmission to adjust a volumetric flow rate of intake air.

12. The method of claim 9, wherein limiting the boost pressure includes providing a first vacuum pressure to a flexible diaphragm of an actuator of each of the bypass wastegates, and wherein limiting the boost pressure to the first level includes providing a second vacuum pressure to the flexible diaphragm of each actuator of the bypass wastegates, said first vacuum pressure different than said second vacuum pressure.

13. A vehicle propulsion system, comprising:
an engine having a plurality of cylinders;
a common air intake manifold communicating with the plurality of cylinders;
a first air intake passage having a first end communicating with the common air intake manifold;
a first compression device arranged along the first air intake passage;
a second air intake passage having a first end communicating with the common air intake manifold;
a second compression device arranged along the second air intake passage, said first and second compression devices receiving intake air from a common air supply;
an anti-surge valve arranged along the first air intake passage; and
a control system including a computer program stored in a non-transitory medium including executable instructions to:
adjust the anti-surge valve in response to a surge threshold to increase volumetric flow rates of the first and second compression devices such that when the volumetric flow rate of the first compression device increases, the volumetric flow rate of the first compression device reaches a choked flow condition before the volumetric flow rate of the second compression device surges to compensate for the volumetric flow rate of the first compression device to provide a total volumetric engine flow delivered to the engine.

14. The vehicle propulsion system of claim 13, wherein a second end of the first air intake passage and a second end of the second air intake passage are joined at a first end of a common intake passage, said common intake passage having a second end communicating with an ambient air supply.

15. The vehicle propulsion system of claim 13, further comprising a throttle arranged along a common intake passage coupling the first end of the first air intake passage and the first end of the second air intake passage to the common air intake manifold; and wherein the control system is further configured to adjust an opening of the throttle to adjust a volumetric flow rate of air consumed by the engine.

16. The vehicle propulsion system of claim 13, further comprising a vehicle drive wheel and a transmission, wherein an output shaft of the engine is coupled to the vehicle drive wheel via the transmission, and wherein the control system is further configured to increase a volumetric flow rate of air consumed by the engine by increasing a gear ratio of the transmission in response to an indication of compressor surge; and wherein the control system is further configured to increase a level of boost pressure in response to said increase of the transmission gear ratio.

17. The vehicle propulsion system of claim 13, where the anti-surge valve is configured to communicatively couple the first air intake passage downstream of the first compression device to a second end of the first intake air passage and to communicatively couple the second air intake passage downstream of the second compression device to a second end of the second intake air passage; and wherein the control system includes further instructions to increase a volumetric flow rate of air flowing through the first and second compression devices without substantially increasing a volumetric flow rate of air consumed by the engine by selectively opening the anti-surge valve.

18. The vehicle propulsion system of claim 13, further comprising a first exhaust passage coupled to a first portion of the plurality of engine cylinders; a second exhaust passage coupled to a second portion of the plurality of engine cylinders; a first turbine arranged along the first exhaust passage and rotationally coupled with the first compression device; a second turbine arranged along the second exhaust passage and rotationally coupled with the second compression device; and wherein the control system includes additional instructions to limit a first volumetric flow rate of exhaust gases provided to the first turbine and a second volumetric flow rate of exhaust gases provided to the second turbine to limit a level of boost pressure provided to the common intake manifold of the engine.

19. The vehicle propulsion system of claim 18, further comprising a first bypass passage bypassing the first turbine; a first wastegate arranged along the first bypass passage; a second bypass passage bypassing the second turbine; a second wastegate arranged along the second bypass passage; and wherein the control system includes additional instructions to limit the first volumetric flow rate by increasing an opening of the first wastegate and instructions to limit the second volumetric flow rate by increasing an opening of the second wastegate.

20. The vehicle propulsion system of claim 18, further comprising a differential pressure sensor configured to provide an indication of pressure difference between the first exhaust passage upstream of the first turbine and the second exhaust passage upstream of the second turbine; and wherein the control system is further configured to reduce a pressure difference indicated by the differential pressure sensor by adjusting a first vacuum pressure provided to an actuator of a first wastegate relative to a second vacuum pressure provided to an actuator of a second wastegate.

\* \* \* \* \*